(12) United States Patent
Sharivker et al.

(10) Patent No.: US 11,253,934 B2
(45) Date of Patent: Feb. 22, 2022

(54) END MILL WITH INDEPENDENT RAKE SURFACES

(71) Applicant: Hanita Metal Works Ltd., Shlomi (IL)

(72) Inventors: Leonid B. Sharivker, Naharia (IL); Sergei V. Boulakhov, Nahariya (IL)

(73) Assignee: KENNAMETAL INC., Latrobe, PA (US)

( * ) Notice: Subject to any disclaimer, the term of this patent is extended or adjusted under 35 U.S.C. 154(b) by 0 days.

(21) Appl. No.: 16/783,354

(22) Filed: Feb. 6, 2020

(65) Prior Publication Data
US 2020/0254539 A1 Aug. 13, 2020

(30) Foreign Application Priority Data
Feb. 10, 2019 (IL) .......................................... 264757

(51) Int. Cl.
*B23C 5/10* (2006.01)
(52) U.S. Cl.
CPC .......... *B23C 5/10* (2013.01); *B23C 2210/045* (2013.01); *B23C 2210/0414* (2013.01); *B23C 2210/0435* (2013.01); *B23C 2210/0471* (2013.01); *B23C 2210/0478* (2013.01)
(58) Field of Classification Search
CPC .......... B23B 2251/046; B23B 2251/14; B23B 2251/18; B23B 2251/28; B23B 51/02; B23B 3/26; B23C 2210/0414; B23C 2210/0428; B23C 2210/0435; B23C 2210/045; B23C 2210/0471; B23C 2210/0478; B23C 2210/084; B23C 2210/086; B23C 5/10
See application file for complete search history.

(56) References Cited

U.S. PATENT DOCUMENTS

| 7,575,401 B1 * | 8/2009 | Garrick | B23B 51/02 |
| | | | 408/145 |
| 8,556,547 B2 * | 10/2013 | Takagi | B23C 5/10 |
| | | | 407/54 |
| 9,381,581 B1 * | 7/2016 | Zaman | B23C 5/10 |

(Continued)

FOREIGN PATENT DOCUMENTS

JP 04159010 A * 6/1992 ............... B23C 5/10

OTHER PUBLICATIONS

JP 04159010 A , Machine Translation, pp. 2-3 (Year: 2021).*
Feb. 9, 2020 Foreign OA P18-06308-IL-NP.

*Primary Examiner* — Nicole N Ramos
(74) *Attorney, Agent, or Firm* — Larry R. Meenan

(57) ABSTRACT

A cutting tool includes: a body extending along a longitudinal axis between a leading and trailing ends, the body having a clamping region disposed at or about the trailing end and a cutting region which extends toward the clamping region from the leading end of the body; a plurality of flutes defined in the body, each extending from the leading end toward the coupling portion; a plurality of peripheral cutting edges, each extending from the leading end toward the coupling portion along a corresponding flute of the plurality of flutes; and a plurality of end cutting edges disposed at the leading end, each end cutting edge extending from at or near the longitudinal axis outward along a corresponding flute. At least one end cutting edge is defined, in-part, by a plurality of rake faces which each extend from a corresponding portion of the one cutting edge into the corresponding flute.

14 Claims, 8 Drawing Sheets

(56) References Cited

U.S. PATENT DOCUMENTS

| | | | |
|---|---|---|---|
| 9,517,515 B2 | 12/2016 | Shpigelman | |
| 9,579,734 B2* | 2/2017 | Baba | B23C 5/10 |
| 10,486,286 B2 | 11/2019 | Kitahata et al. | |
| 2003/0002941 A1* | 1/2003 | Borschert | B24B 3/26 |
| | | | 408/230 |
| 2004/0120777 A1* | 6/2004 | Noland | B23C 5/10 |
| | | | 407/63 |
| 2012/0039677 A1* | 2/2012 | Davis | B23C 5/10 |
| | | | 407/54 |
| 2012/0076597 A1* | 3/2012 | Krenzer | B23B 51/02 |
| | | | 408/227 |
| 2012/0201619 A1* | 8/2012 | Olsson | B24B 3/32 |
| | | | 408/230 |
| 2014/0341662 A1* | 11/2014 | Yamayose | B23C 5/10 |
| | | | 407/54 |
| 2016/0256937 A1* | 9/2016 | Guter | B24B 3/24 |
| 2016/0361769 A1* | 12/2016 | Guter | B24B 3/26 |
| 2017/0144234 A1* | 5/2017 | Shpigelman | B23C 5/10 |

* cited by examiner

END MILL WITH INDEPENDENT RAKE SURFACES

RELATED APPLICATION DATA

The present application claims priority pursuant to 35 U.S.C. § 119(a) to Israeli Patent Application Number 264757 filed Feb. 10, 2019 which is incorporated herein by reference in its entirety.

FIELD

The disclosed concept relates rotary cutting tools and, more particularly to end mills having a plurality of rake surfaces along a given cutting edge.

BACKGROUND

End mills are commonly used in machining operations performed on a metal workpieces. As with any cutting tools used in machining operations, improvements in such mills are constantly being sought which improve tool life, improve surface finish, reduce cutting forces, and generally increase cutting capabilities of the tool (e.g., for end mills, improve drilling and/or ramping capabilities).

Tool life of an end mill is highly dependent on the ability of the cutting corner(s) to stay intact and functional. In most end mill applications, a cutting corners are under complex stresses derived from chip formation, particular tool path and reduced amount of coolant supply (as compared to other areas of the mill).

SUMMARY

End mills in accordance with embodiments of the disclosed concept improve upon conventional designs in several ways. Examples of such improvements include (without limitation): improved chip formation at the cutter's corner section (could be a radius, a chamfer or a sharp corner, improved tool life under complex stresses as for example in ramp down applications, and improved end mill manufacturing processes.

As one aspect of the disclosed concept a cutting tool comprises: a body of generally cylindrical shape extending along a longitudinal axis between a leading end and an opposite trailing end, the body having a clamping region disposed at or about the trailing end of the body and a cutting region extending toward the clamping region from the leading end of the body; a plurality of flutes defined in the body, each of the flutes extending in the cutting region from the leading end of the body toward the coupling portion; a plurality of peripheral cutting edges, each peripheral cutting edge extending from the leading end toward the coupling portion along a corresponding flute of the plurality of flutes; and a plurality of end cutting edges disposed at the leading end of the body, each end cutting edge extending from at or near the longitudinal axis outward along a corresponding flute of the plurality of flutes, wherein at least one end cutting edge of the plurality of end cutting edges is defined, in-part, by a plurality of rake faces which each extend from a corresponding portion of the one cutting edge into the corresponding flute.

The cutting tool may comprise an end mill.

The plurality of rake faces may comprise a first rake face disposed at a first axial rake angle and a second rake face disposed at a second axial rake angle different than the first axial rake angle.

The first rake face may be disposed closer to the longitudinal axis than the second rake face; and the first axial rake angle may be less than the second axial rake angle.

The portion of the one cutting edge corresponding to the first rake face is disposed at a first radial angle; and wherein the portion of the one cutting edge corresponding to the second rake face is disposed at a second radial angle different than the first radial angle.

The portion of the one cutting edge corresponding to the first rake surface may be closer to the longitudinal axis than the portion of the one cutting edge corresponding to the second rake surface and the first radial angle may be less than the second radial angle.

The one cutting edge may extend from a first end at or about the longitudinal axis to an opposite second end, wherein the portion of the one cutting edge corresponding to the first rake face is disposed at the first end of the one cutting edge, and wherein the first radial angle is neutral or positive.

The portion of the one cutting edge corresponding to the second rake face may be disposed at the second end of the one cutting edge, and the second radial angle may be greater than the first radial angle.

The plurality of rake faces may further comprise a third rake face disposed at a third axial rake angle.

The first rake face may be disposed closer to the longitudinal axis than the second rake face; the second rake face may be disposed closer to the longitudinal axis than the third rake face; the first axial rake angle may be less than the second axial rake angle; and the second axial rake angle may be less than the third axial rake angle.

The portion of the one cutting edge corresponding to the first rake face may be disposed at a first radial angle; the portion of the one cutting edge corresponding to the second rake face may be disposed at a second radial angle different than the first radial angle; and the portion of the one cutting edge corresponding to the third face may be disposed at a third axial rake angle.

The one cutting edge may extend from a first end at or about the longitudinal axis to an opposite second end, wherein the portion of the one cutting edge corresponding to the first rake face is disposed at the first end of the one cutting edge, and the first radial angle may be neutral or positive.

The portion of the one cutting edge corresponding to the third rake face may be disposed at the second end of the one cutting edge; the third radial angle may be greater than the first radial angle; and the second radial angle may be different than both the first and the second radial angles.

At least a second cutting edge of the plurality of cutting edges may be defined, in-part, by a second plurality of rake faces which each extend from a corresponding portion of the second cutting edge into the corresponding flute.

The plurality of cutting edges may comprise at least three cutting edges and at least a third cutting edge of the plurality of cutting edges may be defined, in-part, by a third plurality of rake faces which each extend from a corresponding portion of the third cutting edge into the corresponding flute.

The plurality of rake faces may comprise at least four rake faces.

The at least one cutting edge may be disposed in a plane which is perpendicular to the longitudinal axis.

The plurality of end cutting edges may comprise at least three cutting edges, the one cutting edge may extends from a first end at or about the longitudinal axis to an opposite second end, the portion of the one cutting edge corresponding to the first rake face may be disposed at the first end of the one cutting edge, the first radial angle may be neutral or negative.

It is to be understood that for a given example set forth herein, such example may include at least a portion of the subject matter of one or more of any other examples also set forth herein.

These and other examples are described in greater detail in the detailed description which follows.

BRIEF DESCRIPTION OF THE DRAWINGS

Figures 1A, 1C:
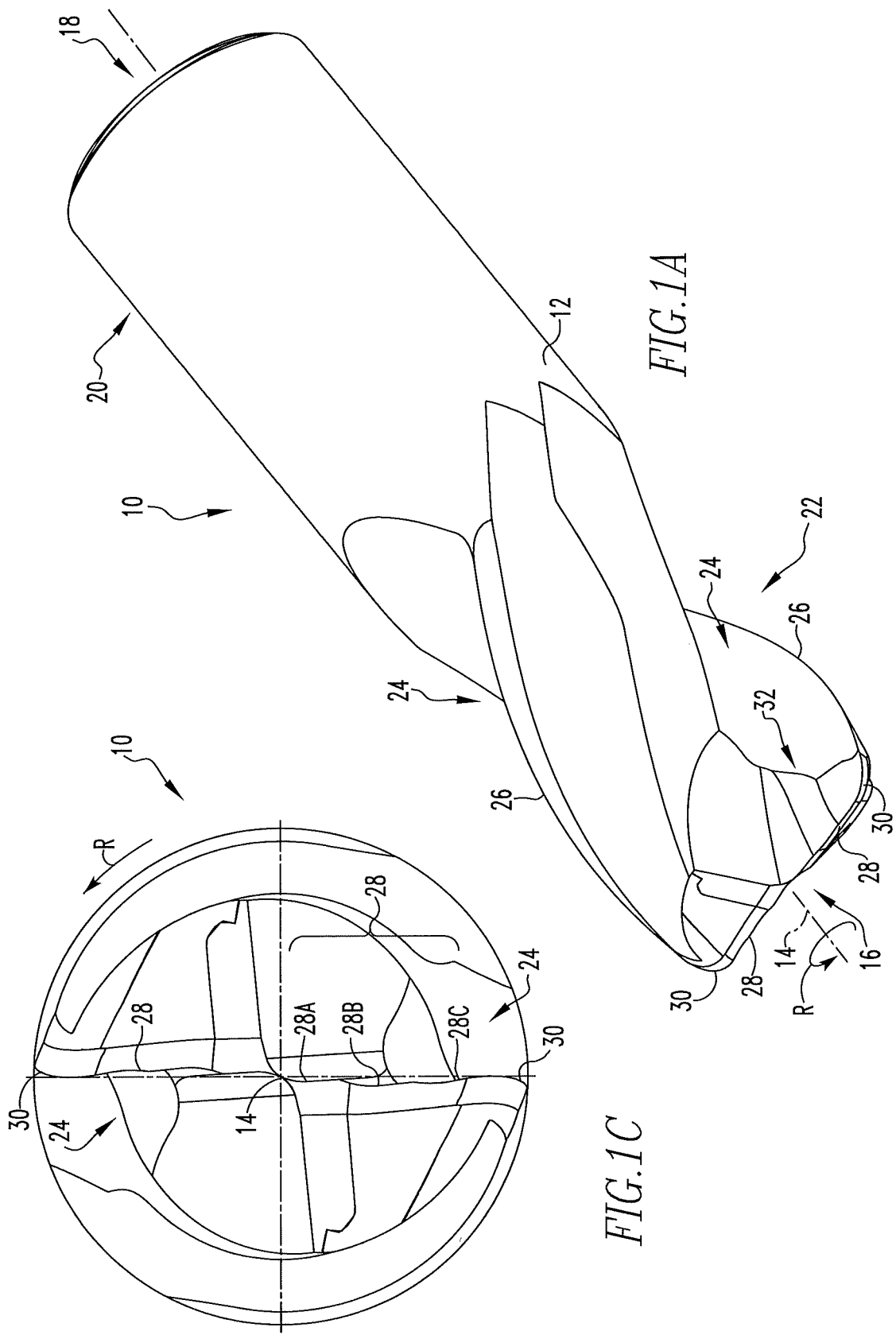

Having thus described examples of the disclosure in general terms, reference will now be made to the accompanying drawings, which are not necessarily drawn to scale, and wherein like reference characters designate the same or similar parts throughout the several views. While various embodiments of the disclosed concept are illustrated, the particular embodiments shown should not be construed to limit the claims. It is anticipated that various changes and modifications may be made without departing from the scope of the disclosed concept.

Figure 1B:
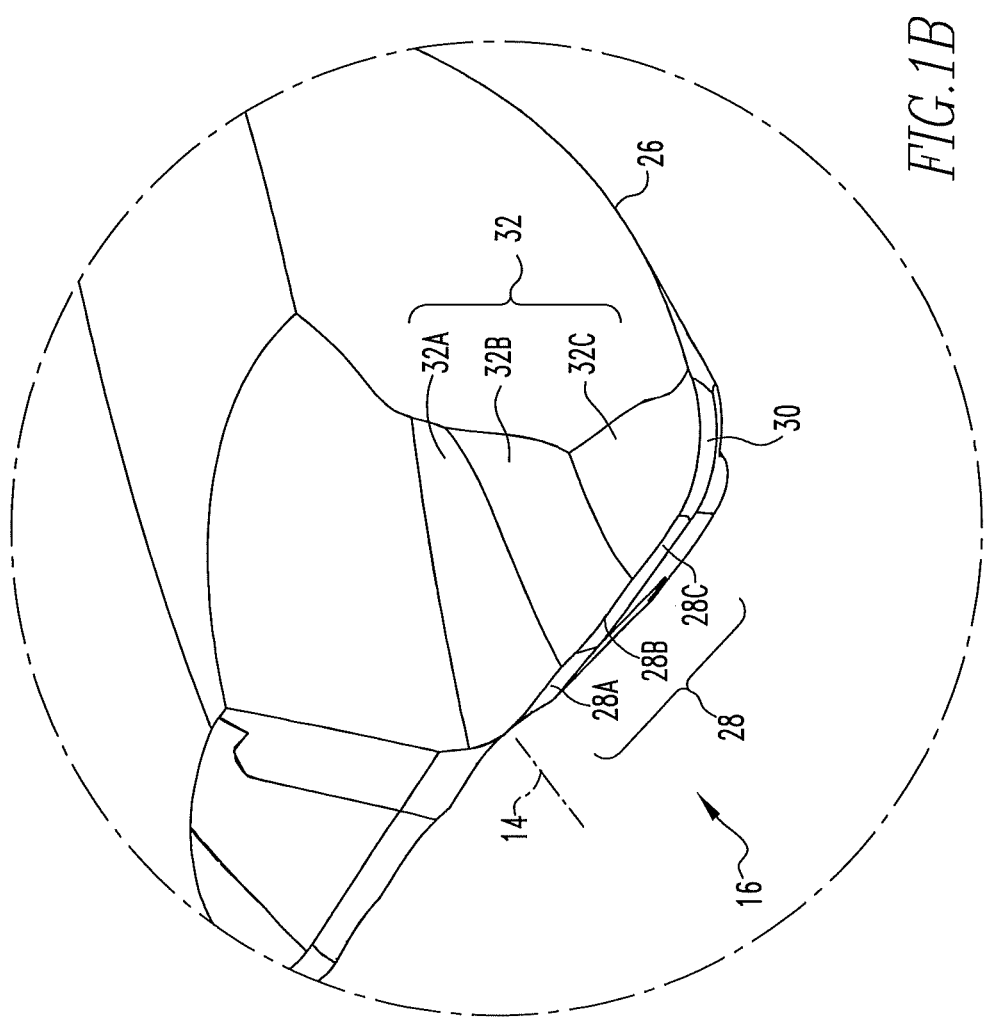
Figure 2:
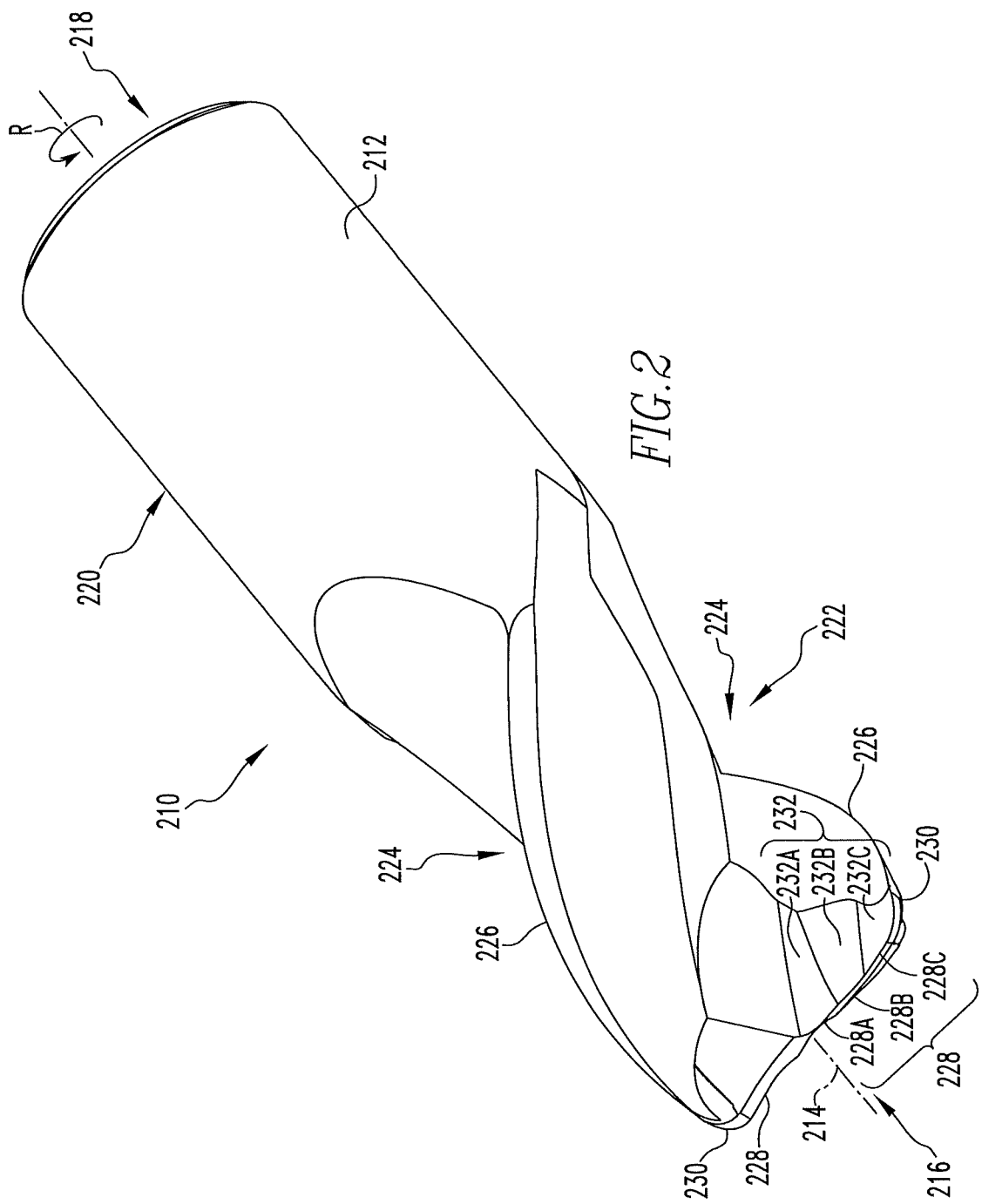
Figure 3:
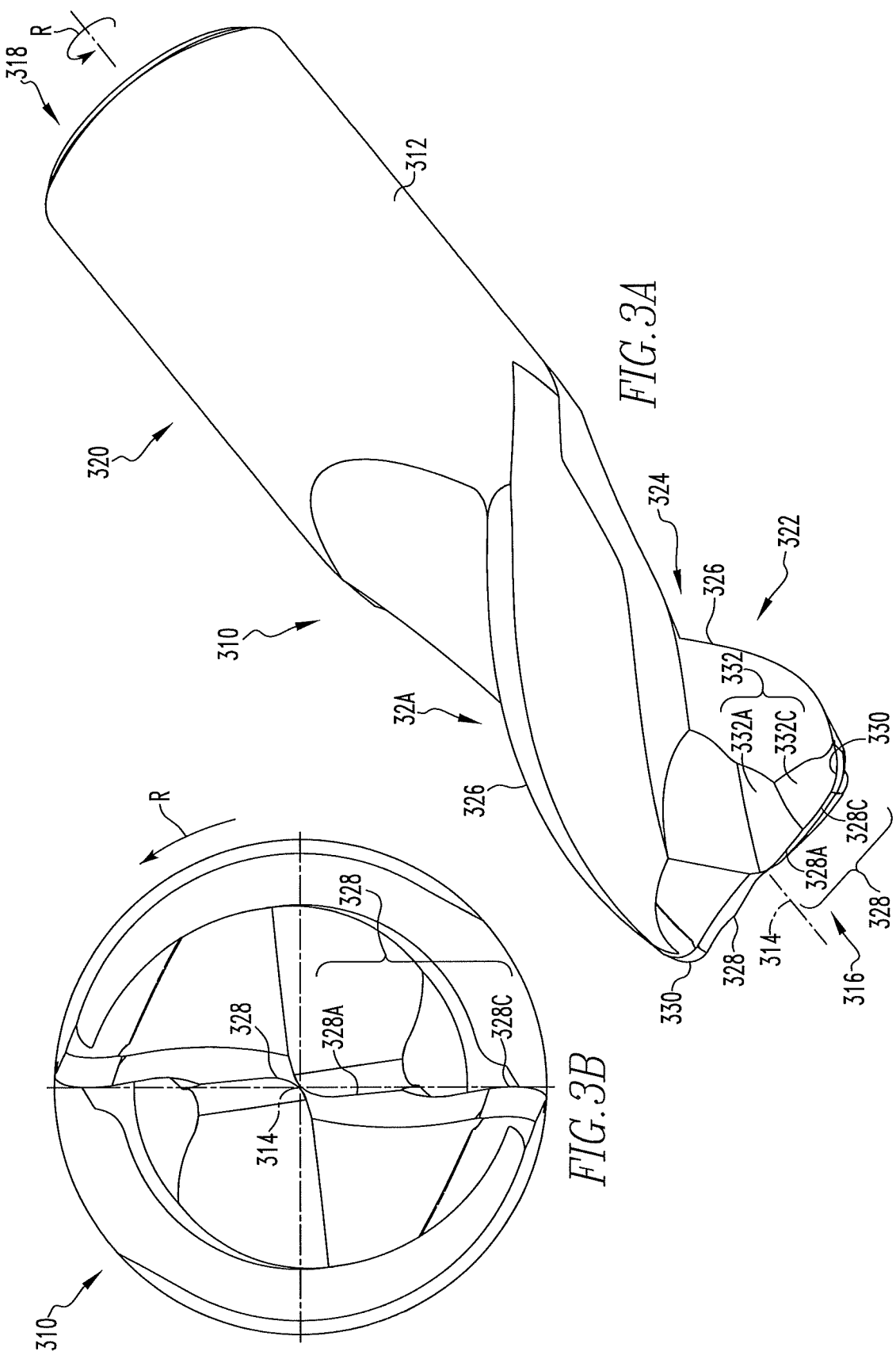
Figure 4:
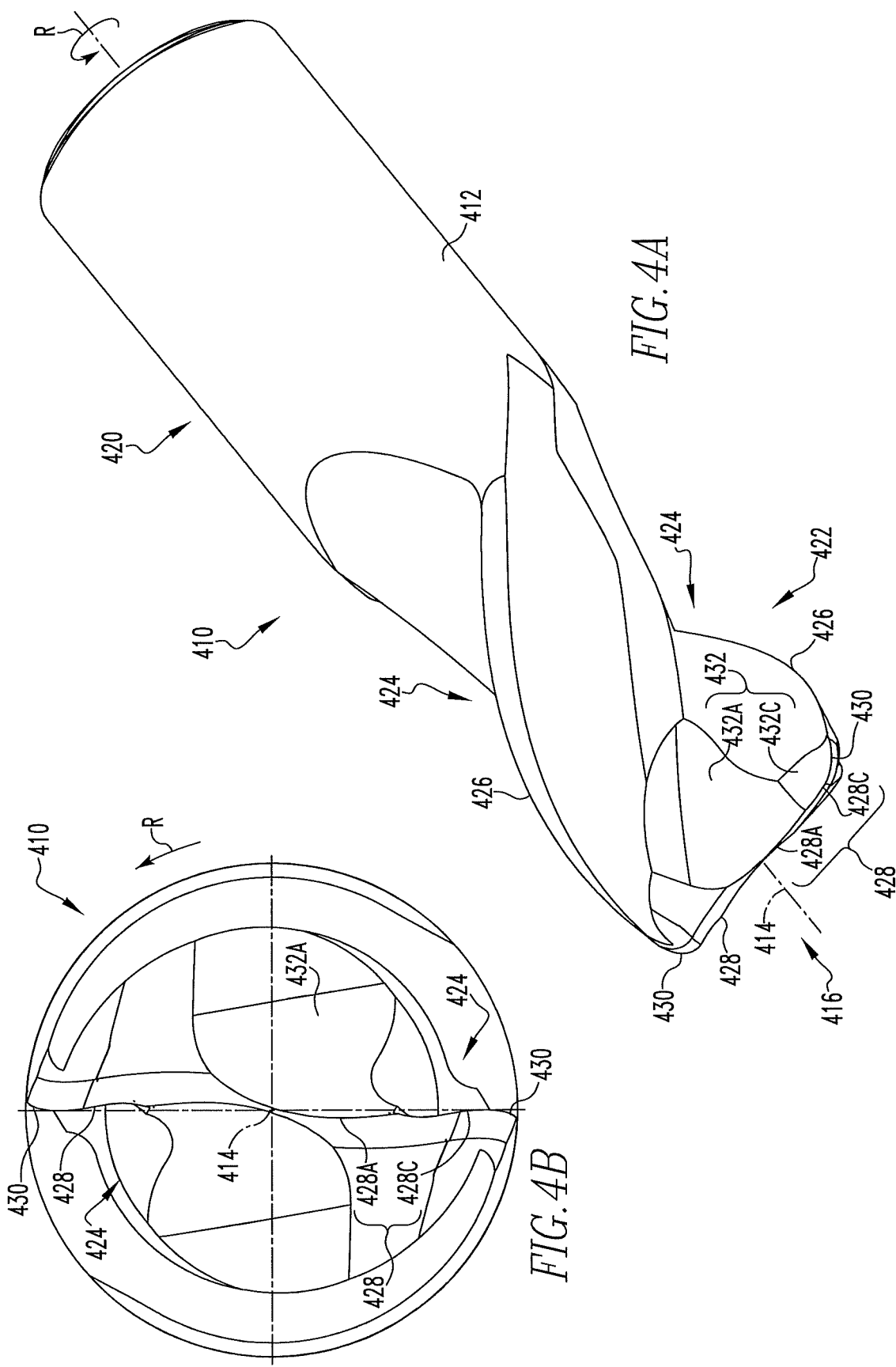
Figure 5:
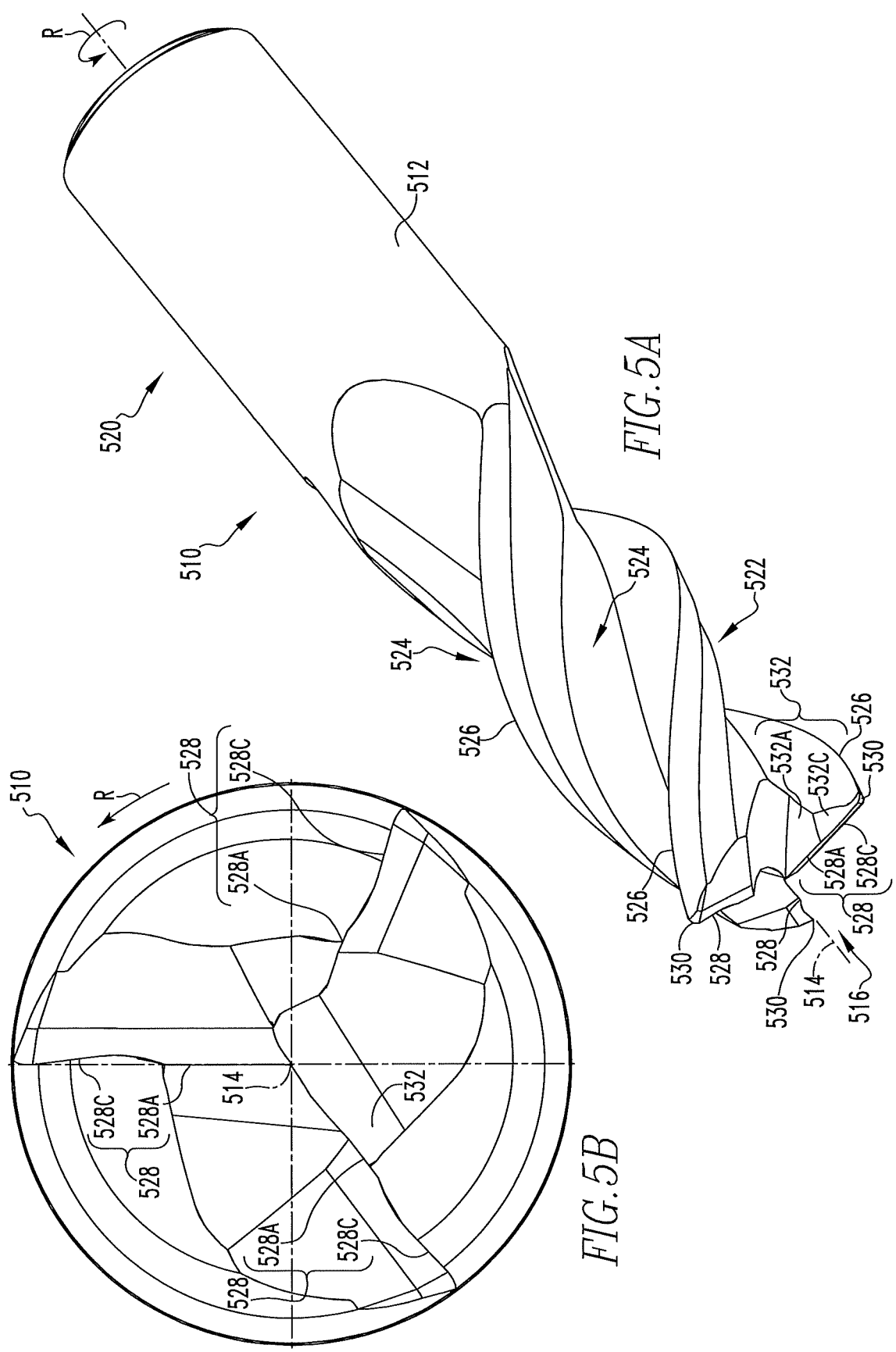
Figure 6:
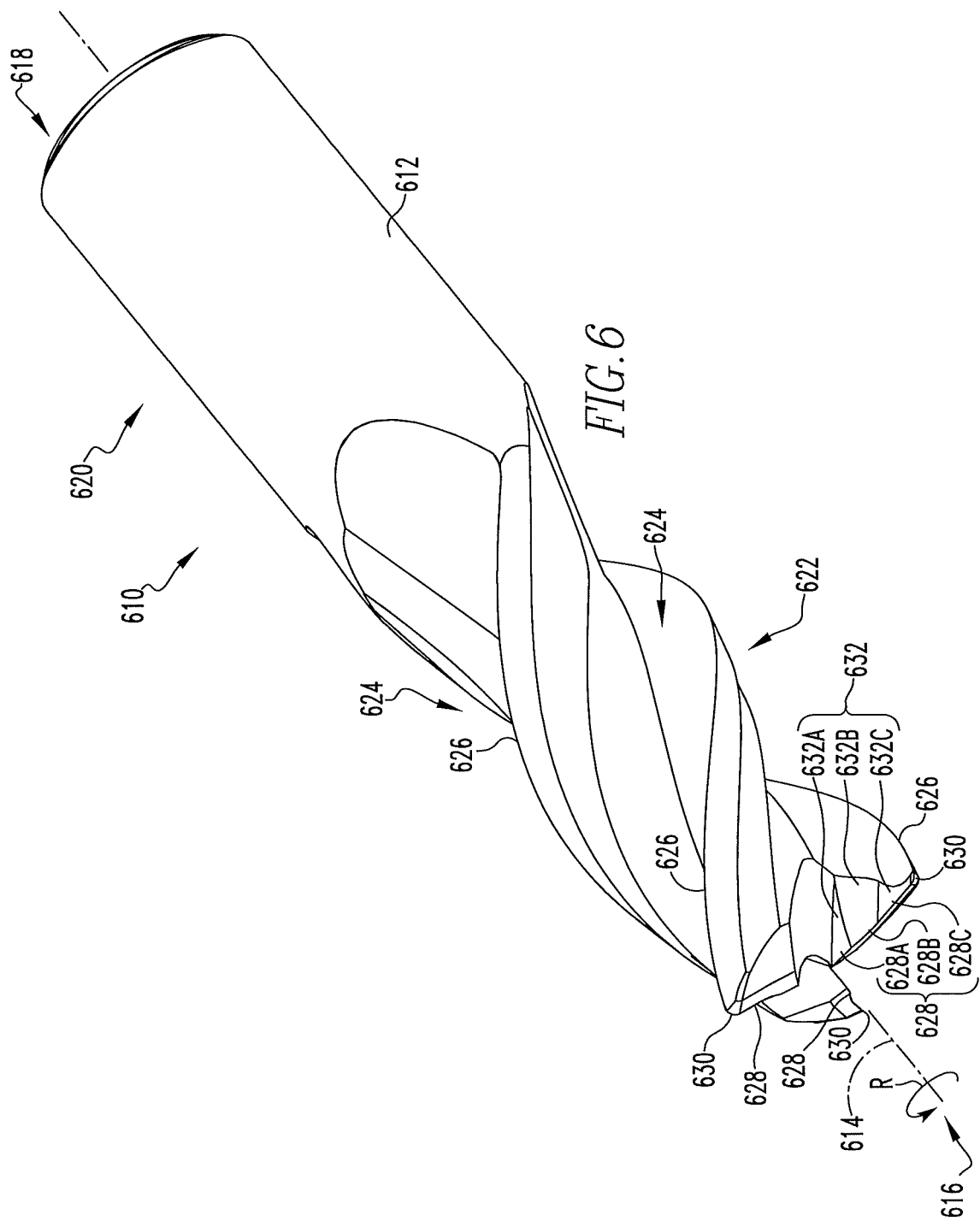
Figure 7:
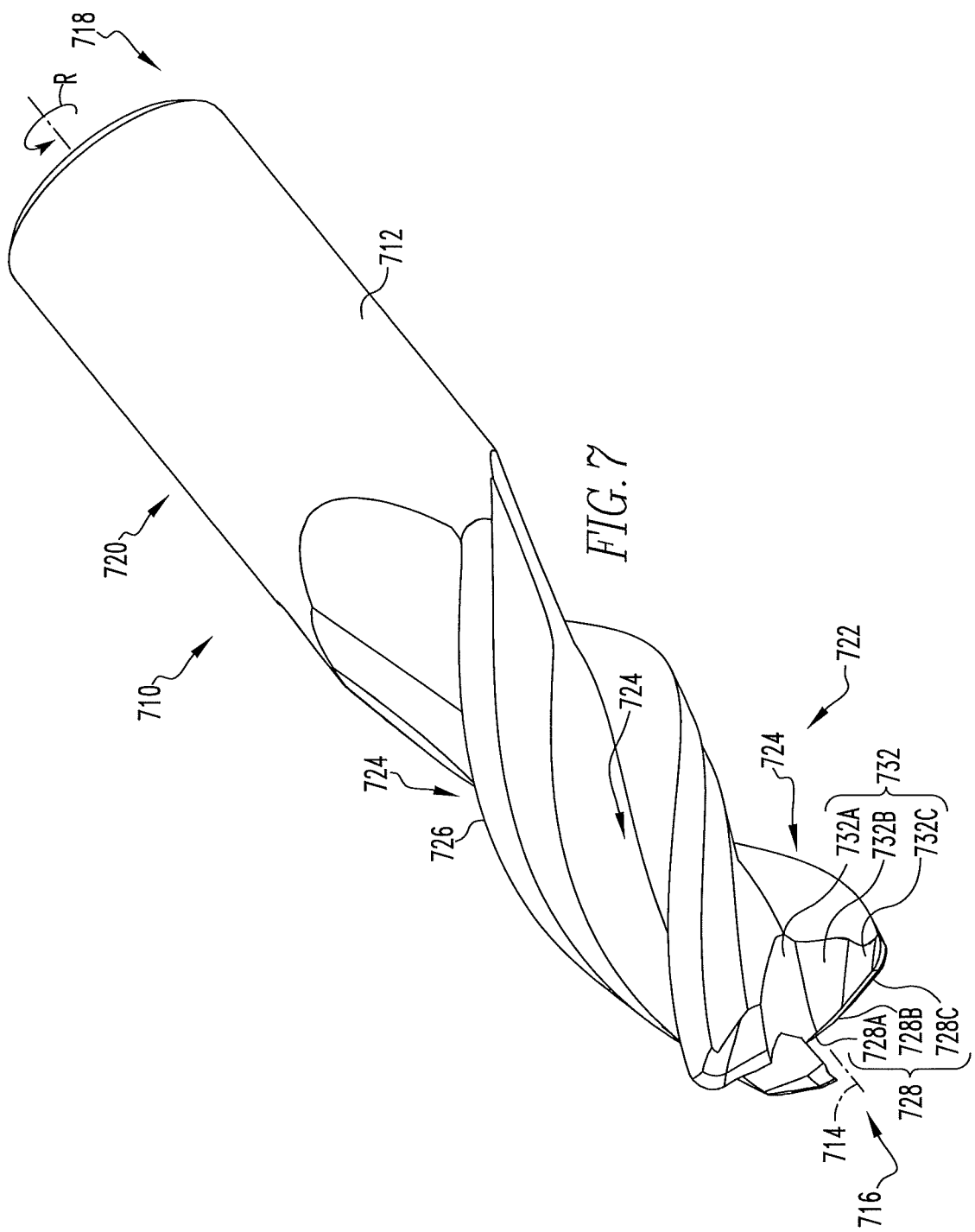

FIG. 1A is a perspective view of an end mill in accordance with an example embodiment of the disclosed concept;

FIG. 1B is a detailed view of the portion of the end mill of FIG. 1A indicated at 1B;

FIG. 1C is an end view of the cutting end of the end mill of FIG. 1A, viewed axially along the rotational axis of the end mill;

FIG. 2 is a perspective view of an end mill in accordance with another example embodiment of the disclosed concept;

FIG. 3A is a perspective view of an end mill in accordance with yet another further example embodiment of the disclosed concept;

FIG. 3B is an end view of the cutting end of the end mill of FIG. 3A, viewed axially along the rotational axis of the end mill;

FIG. 4A is a perspective view of an end mill in accordance with a further example embodiment of the disclosed concept;

FIG. 4B is an end view of the cutting end of the end mill of FIG. 4A, viewed axially along the rotational axis of the end mill;

FIG. 5A is a perspective view of an end mill in accordance with yet a further example embodiment of the disclosed concept;

FIG. 5B is an end view of the cutting end of the end mill of FIG. 5A, viewed axially along the rotational axis of the end mill;

FIG. 6 is a perspective view of an end mill in accordance with yet another further example embodiment of the disclosed concept; and FIG. 7 is a perspective view of an end mill in accordance with yet another example embodiment of the disclosed concept.

DETAILED DESCRIPTION

It is to be understood that certain descriptions of the concepts disclosed herein have been simplified to illustrate only those elements and limitations that are relevant to a clear understanding of the concepts, while eliminating, for purposes of clarity, other elements. Those of ordinary skill in the art, upon considering the present description, will recognize that other elements and/or limitations may be desirable in order to implement the disclosed concepts. However, because such other elements and/or limitations may be readily ascertained by one of ordinary skill upon considering the present description, and are not necessary for a complete understanding of the disclosed concepts, a discussion of such elements and limitations is not provided herein. For example, as discussed herein, embodiments of the end mills in accordance with the disclosed concepts may be produced in the form of entire solid carbide or a solid carbide head comprising a cutting portion and attached to a steel bar by fusion or other manufacturing mechanical methods. The methods by which the end mills are manufactured are generally understood by those of ordinary skill in the art and, accordingly, are not described in detail herein. In addition, all the geometric shapes should be considered to be modified by the term "substantially" wherein the term "substantially" means that the shape is formed within typical design and manufacturing tolerances for cutting tools.

The concepts described herein can be understood more readily by reference to the following detailed description and examples and their previous and following descriptions. Elements, apparatus and methods described herein, however, are not limited to the specific implementations presented in the detailed description and examples. It should be recognized that these implementations are merely illustrative of the principles of the present disclosure. Numerous modifications and adaptations will be readily apparent to those of skill in the art without departing from the spirit and scope of the present disclosure.

Whenever the term "about" or "approximately" is used herein or in the appended claims to modify the dimensions of a feature of an implementation of the present disclosure, it is to be construed as referring to the parameters related to the relevant feature. Whenever a range is used herein or in the appended claims to describe dimensions, temperatures, times, amounts, or the like relating to a feature of an aspect of the present disclosure, the range is to be construed as including the stated end points of the range and every point therebetween.

As used herein, the term "number" shall be used to refer to any non-zero quantity. As used herein, the term "plurality" shall be used to refer to any quantity greater than one, i.e., two or more.

The illustrated embodiments of the disclosed concept will be best understood by reference to the figures. The following description is intended only by way of example and simply illustrates certain selected exemplary embodiments of the concepts as claimed herein. To facilitate easier reference, in advancing from FIG. 1A to and through FIG. 7, a reference numeral is advanced by a multiple of 100 in indicating a substantially similar or analogous component or element with respect to at least one component or element found in one or more earlier figures among FIGS. 1A-7.

Referring to first to FIG. 1A, a perspective view of an end mill 10 in accordance with an example embodiment of the disclosed concept is shown. In the illustrated example of FIG. 1A, end mill 10 is a solid carbide end mill, however, it is to be appreciated that end mill 10 may be in the form of various other types of end mills and related cutting inserts without varying from the scope of the disclosed concept. End mill 10 includes a body 12 of generally cylindrical shape which extends along a central longitudinal axis 14 between a leading end 16 and a trailing end 18 which is disposed opposite leading end 16. Body 10 includes a clamping region 20 disposed at or about trailing end 18 and a cutting region 22 which extends from leading end 16 toward clamping region 20. In the illustrated example of FIG. 1A, clamping region 20 is generally cylindrical in shape and is structured to be secured (via any suitable mechanism) in a tool chuck (not shown) of a machine tool (e.g., without limitation, a CNC machine) for rotating end mill 10 about central longitudinal axis 14 thereof (in a direction such as shown by arrow R). It is to be appreciated that clamping region 20 may be of any other suitable shape or form without varying from the scope of the disclosed concept.

Continuing to refer to FIG. 1A, end mill 10 further includes a plurality of flutes 24 (two are shown in the example) formed/defined in cutting region 22, each flute 24 extending from leading end 16 of end mill 10 rearward toward clamping region 20, as well as a corresponding plurality of peripheral cutting edges 26 and end cutting edges 28 which are generally separated by cutting corners 30. More particularly, each peripheral cutting edge 26 extends from a respective cutting corner 30 rearward toward clamping region 20 in a helical manner along a trailing (with respect to rotation R about axis 14) portion of, and is defined in-in part by, a respective one of flutes 24. Each end cutting edge 28 extends generally radially outward from a first end (not numbered) that is located generally at or about longitudinal axis 14 to a respective cutting corner 30 that is positioned at an outer periphery of leading end 16. Peripheral cutting edges 26, end cutting edges 28, and cutting corners 30 are designed to cooperate with a workpiece being machined during rotation (in direction R) of end mill 10 around axis 14. It is to be appreciated that although the example end mill 10 illustrated in FIG. 1A includes only two flutes 24, and thus only two corresponding: peripheral cutting edges 26, end cutting edges 28, and cutting corners 30, the number of flutes 24 and corresponding structures 26, 28, 30 may be varied without varying from the scope of the disclosed concept.

Continuing to refer to FIG. 1A, each end cutting edge 28 is defined, in-part, by a plurality of independent rake faces 32, each of which extend from a corresponding portion of end cutting edge 28 into the flute 24 which corresponds to the particular end cutting edge 28. Referring to the detail view of FIG. 1B, each end cutting edge 28 of end mill 10 is defined by three rakes faces 32: an inner rake face 32A disposed adjacent longitudinal axis 14 which extends from an inner cutting edge portion 28A of end cutting edge 28; a central rake face 32B disposed adjacent inner rake face 32A which extends from a central cutting edge portion 28B of end cutting edge 28; and an outer rake face 32C disposed adjacent central rake face 32B opposite inner rake face 32A and adjacent cutting corner 30 that extends from an outer cutting edge portion 28C of end cutting edge 28. Each of rake faces 32 are disposed at different axial rake angles. More particularly, inner rake face 32A may be disposed generally at a negative, neutral or slightly positive axial rake angle, central rake face 32B is disposed at an axial rake angle slightly more positive (i.e., slightly greater) than inner rake face 32A, and outer rake face 32C is disposed at an axial rake angle greater than that of central rake face 32B but less than the helix angle (not labeled) of flutes 24. Additionally, as shown in FIG. 1C, each of cutting edge portions 28A-28C are disposed at different radial angles. More particularly, inner cutting edge portion 28A is disposed at a neutral or slightly positive radial angle; central cutting edge portion 28B is disposed at a radial angle which may be similar to, or slightly greater (e.g., up to a degree more, about 2-5 degrees more) than inner cutting edge portion 28A; and outer cutting edge portion 28C is disposed at a radial angle greater than both inner cutting edge portion 28A and central cutting edge portion 28B. Depending on the particular application, outer cutting edge portion 28C is preferably disposed at a radial angle in the range of from about 2 degrees to 20 degrees. For example, in embodiments employed in aluminum cutting operations, outer cutting edge portions 28C disposed at radial angles in the range of 5 to 20 degrees have been employed. As another example, in embodiments employed in steel and titanium cutting operations, outer cutting edge portions 28C disposed at radial angles in the range of 2 to 7 degrees have been employed.

Another example end mill 210 in accordance with the disclosed concept having another arrangement including a cutting edge 228 having three portions cutting edge portions 228A, 228B, and 228C and corresponding rake faces 232A, 232B and 232C arranged similarly as end mill 10 of FIGS. 1A-1C is illustrated in FIG. 2.

Referring now to FIGS. 3A and 3B, an example end mill 310 in accordance with another example embodiment of the disclosed concept which includes only two rake faces 332A and 332C is illustrated. More particularly, end mill 310 includes an inner rake face 332A which extends from an inner cutting edge portion 328A of end cutting edge 328 and an outer rake face 332C which extends from an outer cutting edge portion 328C of end cutting edge 328 between inner rake face 332A and cutting corner 330. Inner rake face 332A may be disposed at an axial rake angle which is negative, neutral, or slightly positive, while outer rake face 332C is disposed at an axial rake angle which is greater than inner rake face 332A but less than the helix angle (not labeled) of flutes 324. As can be appreciated from FIG. 3B, inner cutting edge portion 328A may be disposed at a neutral or slightly positive radial angle while outer cutting edge portion 328C is disposed at a positive radial angle greater than inner cutting edge portion 328A.

Referring now to FIGS. 4A and 4B, an example end mill 410 in accordance with another example embodiment of the disclosed concept which includes only two rake faces 432A and 432C is illustrated. More particularly, end mill 410 includes an inner rake face 432A which extends from an inner cutting edge portion 428A of end cutting edge 428 and an outer rake face 432C which extends from an outer cutting edge portion 428C of end cutting edge 428 between inner rake face 432A and cutting corner 430. Inner rake face 432A may be disposed at a negative, neutral, or slightly positive axial rake angle while outer rake face 432C is disposed at an axial rake angle which is greater than inner rake face 432A but less than the helix angle (not labeled) of flutes 424. As can be appreciated from FIG. 4B, inner cutting edge portion 428A may be disposed at a neutral or positive radial angle while outer cutting edge portion 428C is disposed at a positive radial angle which is greater than inner cutting edge portion 428A.

Referring now to FIGS. 5A and 5B, an example end mill 510 in accordance with another example embodiment of the disclosed concept which includes three cutting edges 528 is illustrated. In general, the three cutting edge designs utilize the same concepts as the two cutting edge designs with the only difference being that the first, inner, portion has a radial angle which is 0 degrees or negative.

As shown in FIG. 5A, cutting edge 528 includes two rake faces 532. More particularly, end mill 510 includes an inner rake face 532A which extends from an inner cutting edge portion 528A of end cutting edge 528 and an outer rake face 532C which extends from an outer cutting edge portion 528C of end cutting edge 528 between inner rake face 532A and cutting corner 530. Inner rake face 532A may be disposed generally at a negative, neutral, or slightly positive axial rake angle while outer rake face 532C is disposed at an axial rake angle which is greater than inner rake face 532A but less than the helix angle (not labeled) of flutes 524. As can be appreciated from FIG. 5B, inner cutting edge portion 528A may be disposed at a slightly negative or neutral radial angle while outer cutting edge portion 428C is disposed at a positive radial angle which is greater than inner cutting edge portion 528A.

Referring now to FIG. 6, an example end mill 610 in accordance with another example embodiment of the disclosed concept which includes three cutting edges is illustrated. Cutting edge 628 includes three rake faces 632. More particularly, end mill 610 includes an inner rake face 632A which extends from an inner cutting edge portion 628A of end cutting edge 628, a central rake face 632B which extends from a central cutting edge portion 628B, and an outer rake face 632C which extends from an outer cutting edge portion 628C of end cutting edge 628 between central rake face 632B and cutting corner 630. Inner rake face 632A may be disposed generally at a negative, neutral, or slightly positive axial rake angle, central rake face 632B is disposed at an axial rake angle slightly more positive than inner rake face 632A, and outer rake face 632C is disposed at an axial rake angle greater than central rake face 632B but less than the helix angle (not labeled) of flutes 624. Inner cutting edge portion 628A may be disposed at a slightly negative or neutral radial angle, central cutting edge portion 628B is disposed at a similar or more positive radial angle than inner cutting edge portion 628A, and outer cutting edge portion 628C is disposed at a radial angle greater than both inner cutting edge portion 628A and central cutting edge portion 628B.

Yet another example end mill 710 in accordance with another example embodiment of the disclosed concept which includes three cutting edges arranged similarly as end mill 610 is illustrated in FIG. 7.

From the foregoing examples it is thus to be appreciated that one or more of: the quantity of cutting edges, the quantity of independent rake faces, the axial rake angles of each of the independent rake faces, and/or the radial angles of the portions of the cutting edges associated with each rake face may be varied without varying from the scope of the disclosed concept.

Various implementations of the present disclosure have been described in fulfillment of the various objectives of the present disclosure. It should be recognized that these implementations are merely illustrative of the principles of the present disclosure. Moreover, although the foregoing descriptions and the associated drawings illustrate examples in the context of certain example combinations of elements and/or functions, numerous modifications and adaptations thereof will be readily apparent to those skilled in the art without departing from the spirit and scope of the present disclosure.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or (objects are not intended to limit the claims in any manner and should not be interpreted as limiting the claims in any manner.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The invention claimed is:

1. A cutting tool comprising:
    a body of generally cylindrical shape extending along a longitudinal axis between a leading end and an opposite trailing end, the body having a clamping region disposed at or about the trailing end of the body and a cutting region extending toward the clamping region from the leading end of the body;
    a plurality of flutes defined in the body, each of the flutes extending in the cutting region from the leading end of the body toward the coupling portion;
    a plurality of end cutting edges disposed at the leading end of the body, each end cutting edge extending from at or near the longitudinal axis outward along a respective flute of the plurality of flutes to a respective corner cutting edge located at an outer periphery of the leading end; and
    a plurality of peripheral cutting edges, each peripheral cutting edge extending from the respective cutting corner rearward toward the coupling portion along the respective flute of the plurality of flutes,
    wherein a first end cutting edge of the plurality of end cutting edges is defined, in part, by a plurality of rake faces, each rake face extending from a portion of the first end cutting edge into the respective flute,
    wherein the plurality of rake faces comprises a first rake face disposed at a first axial rake angle and a second rake face disposed at a second axial rake angle different than the first axial rake angle, wherein a portion of the first end cutting edge corresponding to the first rake face is disposed at a first radial angle; and wherein a portion of the first end cutting edge corresponding to the second rake face is disposed at a second radial angle different than the first radial angle, and wherein the first end cutting edge extends from a first end at or about the longitudinal axis to an opposite second end, wherein the portion of the first end cutting edge corresponding to the first rake face is disposed at the first end of the first end cutting edge, and wherein the first radial angle is positive.

2. The cutting tool of claim 1, wherein the cutting tool comprises an end mill.

3. The cutting tool of claim 1, wherein the first rake face is disposed closer to the longitudinal axis than the second rake face; and wherein the first axial rake angle is less than the second axial rake angle.

4. The cutting tool of claim 1, wherein the first radial angle is less than the second radial angle.

5. The cutting tool of claim 1, wherein the portion of the first end cutting edge corresponding to the second rake face is disposed at the second end of the first end cutting edge, and wherein the second radial angle is greater than the first radial angle.

6. The cutting tool of claim 1, wherein the plurality of rake faces further comprises a third rake face disposed adjacent the second rake face and at a third axial rake angle and at a third radial angle.

7. The cutting tool of claim 6, wherein the second axial rake angle is less than the third axial rake angle.

8. The cutting tool of claim 6, wherein the third radial angle is greater than the first radial angle; and wherein the third radial angle is different than both the first and the second radial angles.

9. The cutting tool of claim 1, wherein a second end cutting edge of the plurality of end cutting edges is defined, in-part, by a second plurality of rake faces which each extend from a corresponding portion of the second end cutting edge into a corresponding flute.

10. The cutting tool of claim 9, wherein the plurality of end cutting edges comprises at least three end cutting edges; and wherein at least a third end cutting edge of the plurality of cutting edges is defined, in-part, by a third plurality of rake faces which each extend from a corresponding portion of the third end cutting edge into a corresponding flute.

11. The cutting tool of claim 1, wherein the plurality of rake faces comprises at least four rake faces.

12. The cutting tool of claim 1, wherein the at least one end cutting edge is disposed in a plane which is perpendicular to the longitudinal axis.

13. A cutting tool comprising:
a body of generally cylindrical shape extending along a longitudinal axis between a leading end and an opposite trailing end, the body having a clamping region disposed at or about the trailing end of the body and a cutting region extending toward the clamping region from the leading end of the body;
a plurality of flutes defined in the body, each of the flutes extending in the cutting region from the leading end of the body toward the coupling portion;
a plurality of end cutting edges disposed at the leading end of the body, each end cutting edge extending from at or near the longitudinal axis outward along a respective flute of the plurality of flutes to a respective corner cutting edge located at an outer periphery of the leading end; and
a plurality of peripheral cutting edges, each peripheral cutting edge extending from the respective cutting corner rearward toward the coupling portion along the respective flute of the plurality of flutes,
wherein a first end cutting edge of the plurality of end cutting edges is defined, inpart, by a plurality of rake faces, each rake face extending from a portion of the first end cutting edge into the respective flute,
wherein the plurality of rake faces comprises a first rake face disposed at a first axial rake angle and a second rake face disposed at a second axial rake angle different than the first axial rake angle,
wherein a portion of the first end cutting edge corresponding to the first rake face is disposed at a first radial angle; and wherein a portion of the first end cutting edge corresponding to the second rake face is disposed at a second radial angle different than the first radial angle,
wherein the first end cutting edge extends from a first end at or about the longitudinal axis to an opposite second end, wherein the portion of the first end cutting edge corresponding to the first rake face is disposed at the first end of the first end cutting edge, and wherein the first radial angle is positive.

14. The cutting tool of claim 13, wherein the portion of the first end cutting edge corresponding to the second rake face is disposed at the second end of the first end cutting edge, and wherein the second radial angle is greater than the first radial angle.

* * * * *